(12) United States Patent
Edwards et al.

(10) Patent No.: US 6,223,695 B1
(45) Date of Patent: *May 1, 2001

(54) LEASH ASSEMBLY HAVING PET REFUSE BAG DISPENSER MECHANISM

(76) Inventors: Timothy Edwards; Mary Edwards, both of 2090 Dewberry Ct., Westlake Village, CA (US) 91361

(*) Notice: Subject to any disclaimer, the term of this patent is extended or adjusted under 35 U.S.C. 154(b) by 0 days.

This patent is subject to a terminal disclaimer.

(21) Appl. No.: 09/387,805

(22) Filed: Sep. 1, 1999

Related U.S. Application Data

(60) Provisional application No. 60/100,484, filed on Sep. 16, 1998, and provisional application No. 60/040,998, filed on Apr. 21, 1997.

(51) Int. Cl.[7] .............................. A01K 27/00; B65H 75/34
(52) U.S. Cl. ............................ 119/796; 119/795; 119/858
(58) Field of Search .................................. 119/795, 796, 119/792, 797, 858, 867

(56) References Cited

U.S. PATENT DOCUMENTS

| | | |
|---|---|---|
| 2,652,054 | 9/1953 | Bishop . |
| 4,095,729 | 6/1978 | Butera . |
| 4,516,676 | 5/1985 | Cournoyer . |
| 4,538,727 | 9/1985 | Solloway . |
| 4,738,385 | 4/1988 | Bell . |
| 5,050,760 | 9/1991 | Garcia . |
| 5,064,233 | 11/1991 | Sloan . |
| 5,135,134 | 8/1992 | Dancy . |
| 5,265,785 | 11/1993 | Chudy . |
| 5,363,809 | 11/1994 | Roe . |
| 5,441,017 | 8/1995 | Lindsay . |
| 5,540,469 | 7/1996 | Albert . |
| 5,611,455 | 3/1997 | McCreary . |
| 5,680,978 | 10/1997 | Pinion . |
| 5,727,500 * | 3/1998 | Conboy ................................ 119/174 |
| 5,819,984 | 10/1998 | Krueger . |
| 6,019,067 * | 2/2000 | Carey .................................. 119/795 |
| 6,035,809 * | 3/2000 | Fingerett et al. .................... 119/796 |
| 6,073,590 * | 6/2000 | Polding .............................. 119/795 |
| 6,076,717 * | 6/2000 | Edwards et al. ........................ 225/6 |
| 6,085,695 * | 7/2000 | Miller et al. ........................ 119/795 |

OTHER PUBLICATIONS

Webster's Definition of "Lid".*
Pooch Conquer the World, Take Your Pooch!, Accrafect Products, Inc., two pages.
Leash Luggage "Keep our community Doo–Dee free!", Leash Luggage, two pages.

* cited by examiner

*Primary Examiner*—Charles T. Jordan
*Assistant Examiner*—Judith A. Nelson
(74) *Attorney, Agent, or Firm*—Kelly Bauersfeld Lowry & Kelley, LLP

(57) ABSTRACT

A leash assembly includes a retractable leash in combination with a pet refuse bag dispenser. The bag dispenser underlies a handle of the leash and includes a lid for permitting access to an inner cavity in which a plurality of bags are disposed. The bag dispenser is either integrally formed with the leash handle, or removably connected to a base of the handle. The plastic bags are disposed within the inner cavity such that the bags may be individually removed. The plastic bags may be selectively removed through a window provided in a side wall of the bag dispenser. The plastic bags may also be removed through a lid having slits through a flexible membrane. Alternatively, a cartridge containing the folded bags is inserted into the bag dispenser and either includes a window which substantially aligns with the bag dispenser window for access to the plastic bags, or a tear away tab for the removal of the bags through an open end of the bag dispenser.

27 Claims, 7 Drawing Sheets

FIG.1
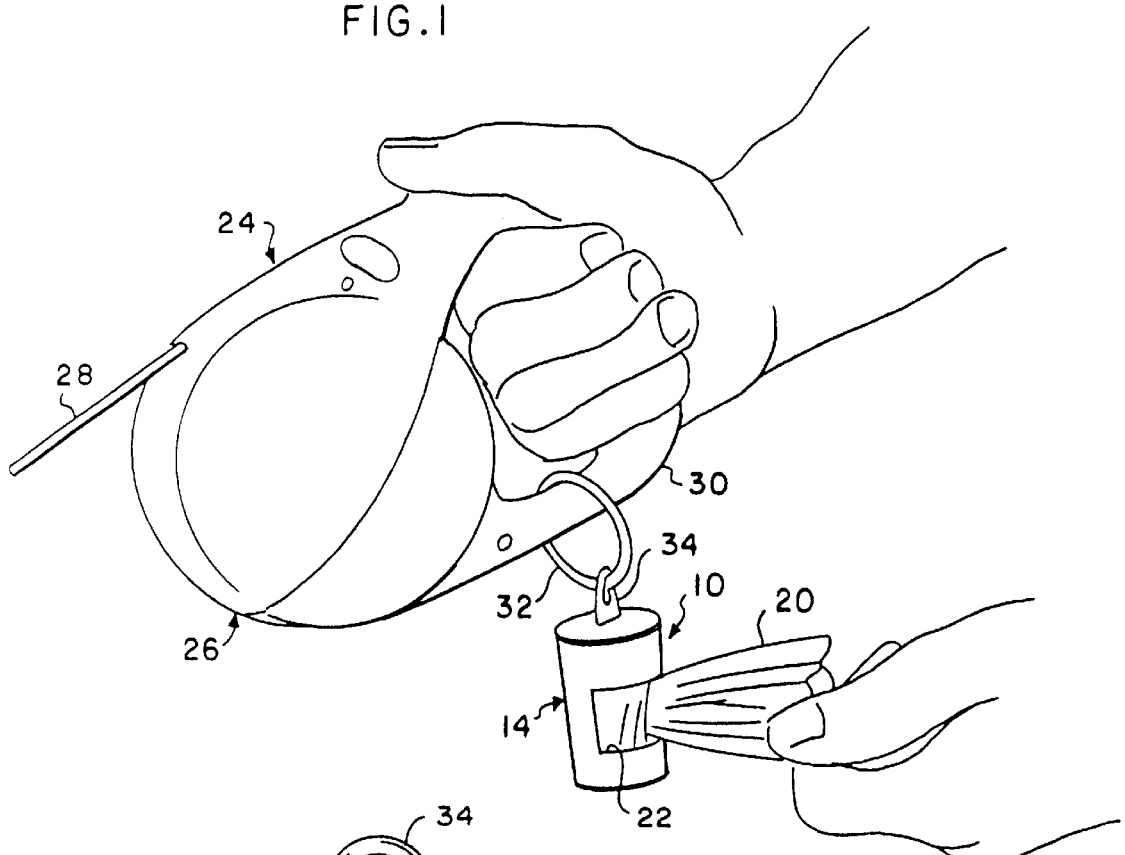
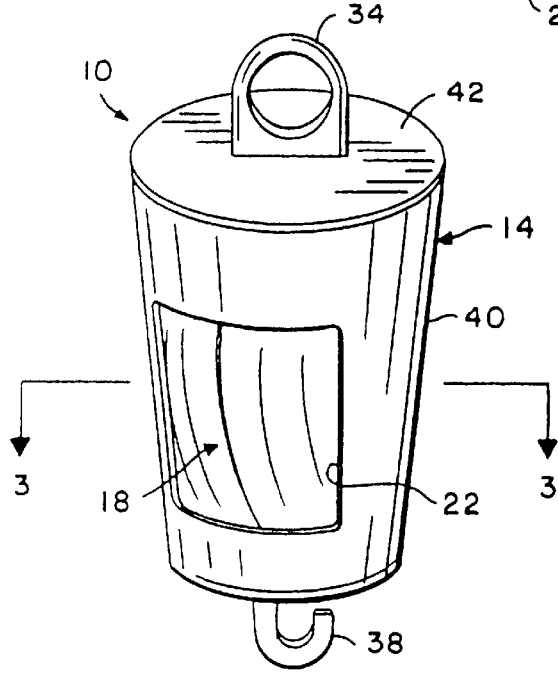
FIG.2

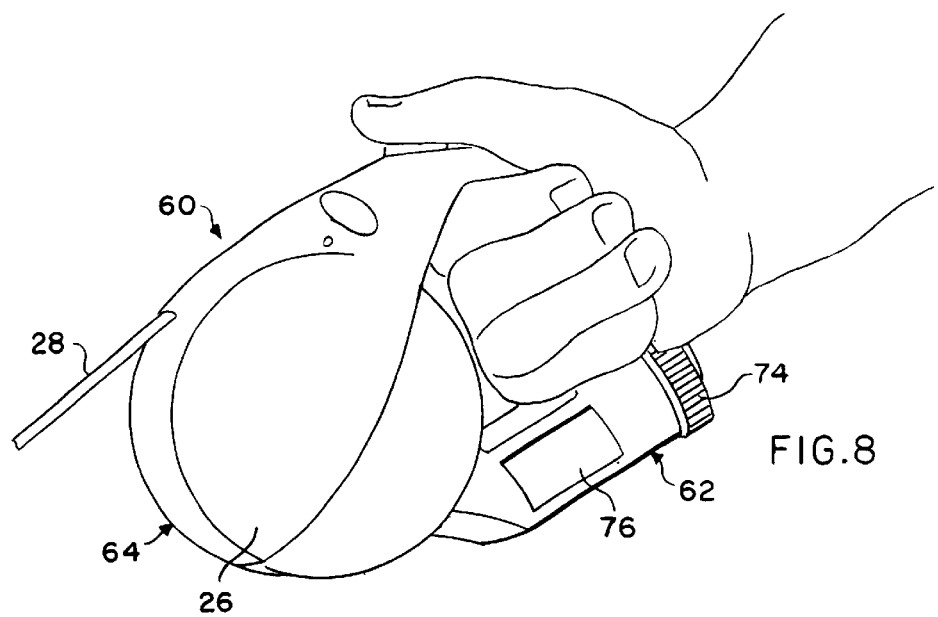
FIG. 8
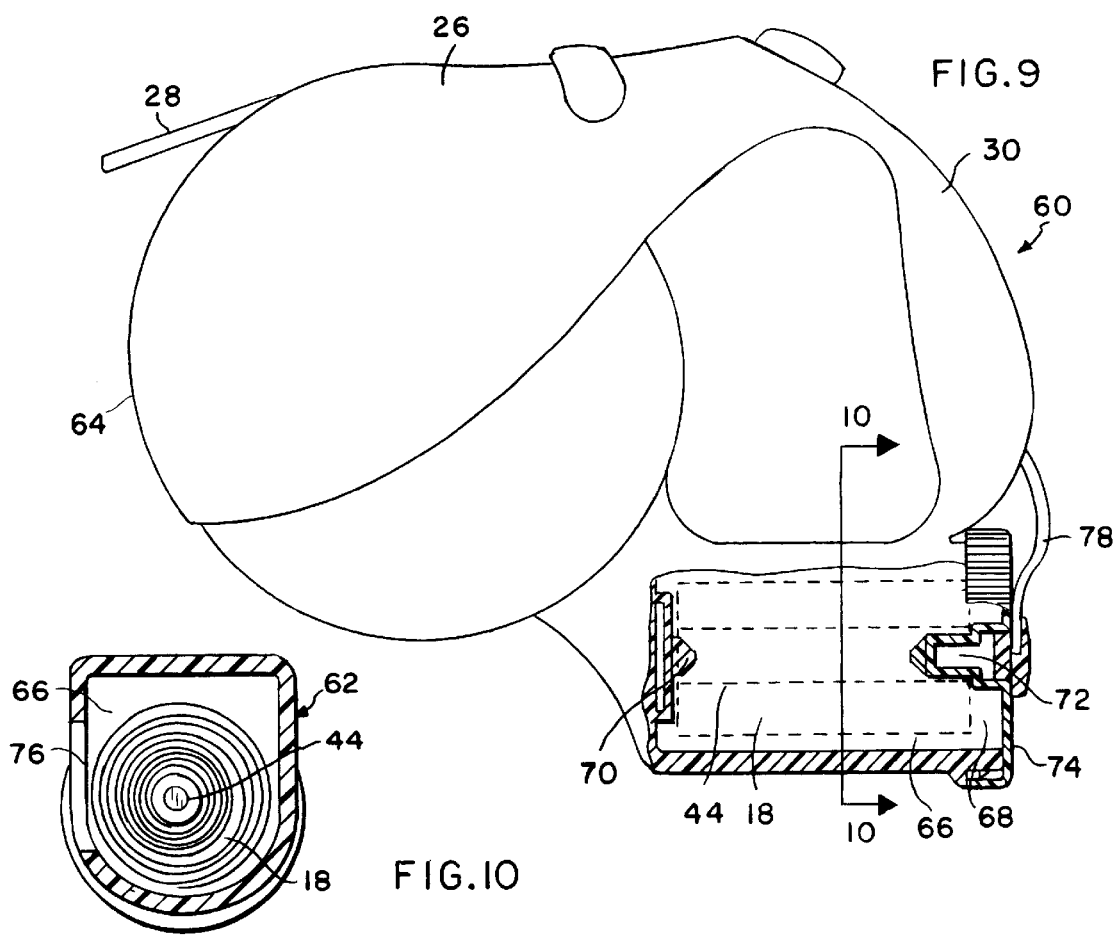
FIG. 9
FIG. 10

LEASH ASSEMBLY HAVING PET REFUSE BAG DISPENSER MECHANISM

RELATED APPLICATION

This application also claims priority from U.S. patent application Ser. No. 09/059,730, filed Apr. 13, 1998, now U.S. Pat. No. 6,076,717, which claimed priority from Provisional Application No. 60/040,998, filed Apr. 21, 1997.

This application claims priority from U.S. provisional patent application Ser. No. 60/100,484 filed Sep. 16, 1998.

BACKGROUND OF THE INVENTION

This invention relates to leash assemblies and devices for collecting animal litter. More specifically, the present invention relates to a pet refuse bag dispenser which is incorporated into a leash, that may be advantageously utilized to conveniently access a plastic bag into which animal litter may be placed when desired.

The rapid increase of urban population coupled with the increasing popularity of dogs and other pets has created a serious sanitary problem in connection with the disposal of animal litter, and particular canine litter. Because many animal pet owners have permitted their animals to deposit solid excrement on both private and public property, a number of communities have enacted ordinances requiring pet owners, under penalty of fine, to retrieve and dispose of lifter created by their pets.

It has been found that the willingness of pet owners to retrieve and properly dispose of animal litter is related to the ease, convenience and economy with which the litter may be handled in a clean and sanitary manner. While a number of devices have been proposed for the purpose of disposing of animal litter, they have suffered from various shortcomings. Some devices are not completely disposable and, therefore, require some degree of cleanup. Other types of devices, both of the disposable and reusable varieties, are awkward and/or conspicuous to carry. Moreover, some prior animal lifter collection devices are too expensive for everyday use.

One commonly accepted method for collecting and storing animal litter until a proper disposal site can be found involves the use of a disposable plastic bag. Some pet owners will simply place a plastic bag, such as a plastic grocery bag, in a clothing pocket for retrieval when needed. This method of collecting animal lifter presupposes, however, that the pet owner will always have access to and remember to grab a plastic bag prior to walking the pet. There have been proposals to provide devices which would store plastic bags within a container that may be worn by the owner or the pet. Each of these prior devices, however, suffers several disadvantages which the present invention is intended to overcome.

The retractable leash has been gaining popularity for the last twenty years and has taken its place as a permanent pet product. Some have recognized the desirability of providing an easy way to carry pet waste cleanup bags when going for a walk utilizing such a retractable leash. An example is found in U.S. Pat. No. 5,540,469. In that reference, a retractable leash is placed into an animal waste collecting device which incorporates its own handle, bag holder and flashlight. It is believed, however, that such an assembly involves apparatus and associated costs which are undesirable.

Accordingly, there is a need for a novel pet refuse bag dispenser which is incorporated into or attached onto a retractable leash device to provide access to a roll of plastic bags when needed. The present invention fulfills this need and provides other related advantages.

SUMMARY OF THE INVENTION

The present invention resides in a leash assembly comprising the combination of a pet refuse bag dispenser with a retractable leash. More particularly, the leash assembly is comprised of a housing defining a handle for the leash assembly and an interior compartment from which a leash extends. A generally tubular bag dispenser underlies the handle and includes a lid which permits access to an inner cavity in which a plurality of bags are disposed. The lid typically comprises a removable cap which is threaded over an open end of the bag dispenser.

The bag dispenser is either integrally formed with the leash handle or removably connected to a base of the handle. In leash assemblies utilizing the removable bag dispenser, a clamp is formed with or otherwise attached to the handle. The clamp has an open faced channel and opposing side grooves which slidingly accept a mating rail formed on a top portion of the bag dispenser. The bag dispenser is connected to the handle by sliding the rail into the grooves of the open faced channel until the rail is completely inserted and a frictional fit is formed. Likewise, the bag dispenser is removed from the leash handle by sliding the bag dispenser out of the side grooves.

In one embodiment, the plurality of plastic bags are rolled and detachably connected end to end. Means for centrally and rotationally retaining the roll of plastic bags within the bag dispenser are provided. Such means include a tubular axle about which the roll of plastic bags is wound, opposing axle guides about which the tubular axle and thus the roll of plastic bags rotate. One axle guide is formed with the lid, and the opposing axle guide is formed within an opposite end of the bag dispenser. A window is formed in a side wall of the bag dispenser so that individual plastic bags may be removed from the bag dispenser.

In another embodiment, the plurality of plastic bags are folded and contained within a cartridge which is frictionally fitted within the bag dispenser through the open end. A window is provided on a side wall of the cartridge which substantially aligns with the window of the bag dispenser so that the plastic bags may be selectively removed from the aligned windows.

In yet another embodiment, a cartridge containing a plurality of folded plastic bags is frictionally fitted within the bag dispenser through the open end of the bag dispenser. The cartridge has a tear away tab at its base, allowing the individual removal of the plastic bags from the cartridge through the open end of the bag dispenser.

In yet a further embodiment, the lid includes an aperture and a flexible membrane having slits substantially aligned with the aperture for the removal of the plastic bags from the bag dispenser through the slits in the membrane of the lid. The plastic bags are preferably rolled and detachably connected end to end.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of one embodiment of a pet refuse bag dispenser attached to a retractable leash device which is the subject of U.S. patent application Ser. No. 09/059,730, illustrating the manner in which a plastic bag is withdrawn from the dispenser through an aperture in a housing thereof;

FIG. 2 is an enlarged top and side perspective view of the pet refuse bag dispenser illustrated in FIG. 1;

FIG. 8 is a perspective view of a leash assembly embodying the present invention, wherein the leash assembly comprises the combination of a pet refuse bag dispenser with a retractable leash;

FIG. 9 is an enlarged elevational and partially sectional view of the leash assembly of FIG. 8;

FIG. 10 is a sectional view taken generally along the line 10—10 of FIG. 9;

DETAILED DESCRIPTION OF THE PREFERRED EMBODIMENTS

Figure 3:
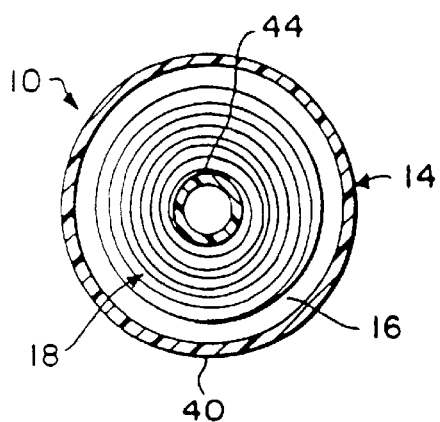
FIG. 3 is a horizontal section taken generally along the line 3—3 of FIG. 2, illustrating the positioning of a roll of plastic bags within a cylindrical base.
Figure 4:
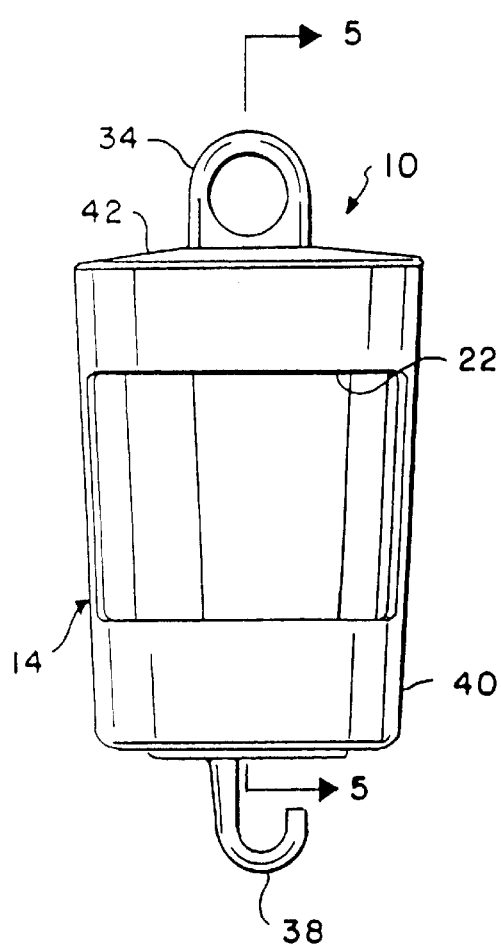
FIG. 4 is a side elevational view of the dispenser of FIGS. 1–3.
Figure 5:
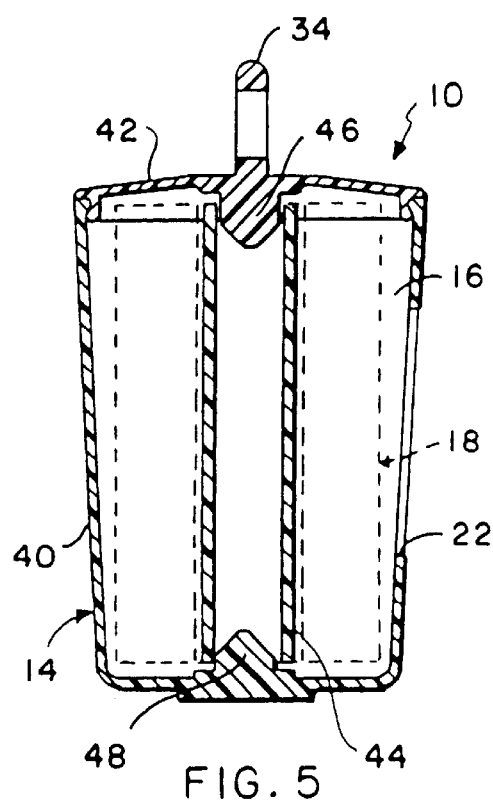
FIG. 5 is an elevational sectional view taken generally along the line 5—5 of FIG. 4.

As shown in FIGS. 8–19 for purposes of illustration, the present invention is concerned with a leash assembly 60 having a pet refuse bag dispenser mechanism associated therewith. By way of background information, related pet refuse bag dispensers, generally illustrated in FIGS. 1–5 by the reference number 10 and in FIGS. 6 and 7 by the reference number 12 are illustrated and described herein. The pet refuse bag dispensers 10 and 12 each include a housing 14, 14' which defines an inner cavity 16, 16' for holding therein a roll 18 of a plurality of plastic bags 20 which are connected end-to-end. The roll 18 of plastic bags 20 is disposed within the inner cavity 16, 16' of the housing 14, 14' such that the bags may be individually removed therefrom through a housing aperture 22, 22'.

The pet refuse bag dispensers 10 and 12 are intended to be utilized in connection with a collar or a leash device 24 commonly utilized when walking one's pet. The exemplary leash device 24 illustrated in FIG. 1 comprises a leash housing 26 from which a retractable leash 28 extends. A handle 30 is formed with the leash housing 26, and a ring or bead tie 32 is utilized to connect the dispensers 10 and 12 conveniently to the leash device 24. In this regard, the pet refuse bag dispenser 10 illustrated in FIG. 1 includes an upper eye loop 34 integrally formed with the housing 14 through which the ring or bead tie 32 is placed to securely affix the dispenser 10 to the leash device 24. Alternatively, with regard to the pet refuse bag dispenser 12 of FIG. 6, an aperture 36 is provided through which the bead tie 32 may be placed to similarly affix the dispenser 12 to the leash device 24 or collar.

Referring now specifically to FIGS. 2–5, the pet refuse bag dispenser 10 is generally cylindrical in shape having the aperture 22 provided in a side wall of the housing 14, with the eye loop 34 extending from an upper end of the housing 14 and a hook 38 extending downwardly from a lower end of the housing 14. The hook is provided to permit the user to place a knot tied in one of the plastic bags 20 after animal litter has been collected on one side of the hook 38 such that the weight of the litter within the bag will hold the plastic bag in place. This advantageously permits the user place the bag onto the dispenser 10 until a proper disposal site is reached. Of course, other forms of retainers, including clips and the like may be substituted for the hook 38.

The housing 14 comprises a cylindrical base 40 which has an open upper end through which the roll 18 of plastic bags 20 may be inserted into the inner cavity 16, and a removable lid 42 for enclosing the upper open end of the cylindrical base 40. As shown, the lid 42 snap-fits onto the open upper end of the cylindrical base 40.

The bag dispenser 10 further includes means for centrally and rotationally retaining the roll 18 of plastic bags 20 within the housing 14. This includes a tubular axle 44 about which the roll of plastic bags is wound, and means for positioning the axle centrally within the inner cavity 16 of the housing 14 such that the tubular axle, and thus the roll of plastic bags, may rotate therein. More specifically, the axle positioning means comprises an upper axle guide 46 which is integrally formed with the lid 42 and extends downwardly therefrom into the inner cavity 16, and a lower axle guide 48 that is integrally formed with the cylindrical base 40 and extends upwardly into the inner cavity 16. The tubular axle 44 is configured so that the ends thereof fit over the upper and lower axle guides 46 and 48 to be securely yet rotatably retained centrally within the inner cavity 16.

In use, fifteen or so plastic bags 20 are wound about the tubular axle 44 to form the roll 18. The lid 42 may be removed from the cylindrical base 40 to place the roll 18 within the inner cavity 16. The lower end of the tubular axle 44 is fitted over the lower axle guide 48. When the lid 42 is replaced over the open upper end of the cylindrical base 40 and snap-fit into place, the upper guide axle guide 46 is disposed within the upper end of the tubular axle 44. The end bag 20 of the roll 18 may then be accessed through the housing aperture 22 and withdrawn from the housing 14 as desired. The entire roll 18 of plastic bags 20 disposed on the tubular axle 44 will rotate within the housing 14 as the bags 20 are withdrawn therefrom. The bags are preferably releasably attached to one another such that one bag may be easily separated from another after being withdrawn from the dispenser 10, yet the bags are sufficiently attached to one another to prevent such separation as they are being withdrawn from the dispenser.

Figure 6:
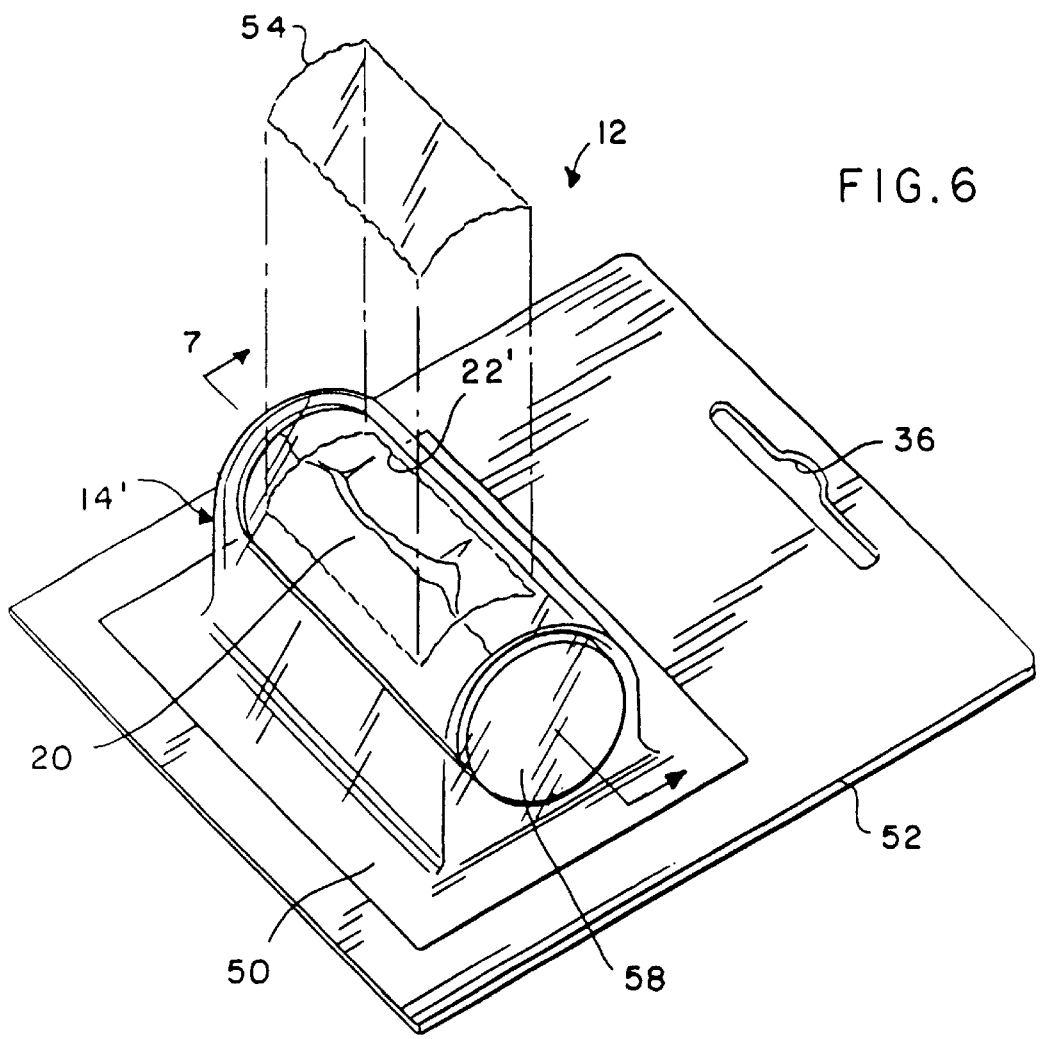
FIG. 6 is a perspective view of a second form of the pet refuse bag dispenser and which also is the subject of U.S. patent application Ser. No. 09/059,730, wherein the housing comprises a blister pack affixed to a backing so as to capture the roll of plastic bags therebetween.
Figure 7:
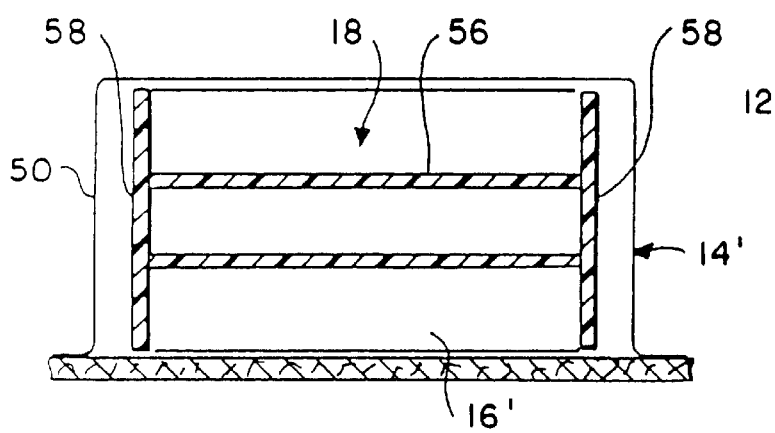
FIG. 7 is a sectional view taken generally along the line 7—7 of FIG. 6.

Referring now to FIGS. 6 and 7, the housing 14', comprises a blister pack 50 which is affixed to a backing 52 so as to capture the roll 18 of plastic bags 20 therebetween. The blister pack 50 and the backing cooperatively define therebetween the inner cavity 16', and the housing aperture 22' is provided in a front face of the blister back 50. A cover 54 may be placed over the aperture 22' in the blister pack 50 to completely enclose the roll 18 of plastic bags 20 until it is desired to remove a plastic bag 20 for use.

As was the case in the prior embodiment, means are provided for centrally and rotationally retaining the roll 18 of plastic bags 20 within the housing 14'. Again, a tubular axle 56 is provided about which the roll of plastic bags is wound. At opposite ends of the tubular axle 56 are provided circular flanges 58. The circular flanges 58 provide means for positioning the axle 56 centrally within the inner cavity 16' of the housing 14' such that the axle 56, and thus the roll 18 of plastic bags 20, may rotate therein.

In operation, the pet refuse bag dispenser 12 operates in much the same manner as the dispenser 10 of FIGS. 1–5. The particular manner in which the dispenser 12 has been packaged, however, permits a single roll 18 of plastic bags 20 to be packaged for use in a housing 14 which is disposable once the last plastic bag 20 is utilized.

In accordance with the present invention, and with reference to FIGS. 8–10, the leash assembly 60 comprises the combination of a pet refuse bag dispenser 62 with a retractable leash device 64. The dispenser 62 is identical to the roll 18 of plastic bags disposed within the housing 14 described above. More particularly, the dispenser 62 includes a tubular axle 44 about which the roll of plastic bags is wound. Typically, fifteen or so plastic bags 20 are wound about the tubular axle 44 to form the roll 18.

The leash device 64 is similar to the leash device 24 illustrated in FIG. 1 and includes a leash housing 26 from which a retractable leash 28 extends. A handle 30 is formed with the leash housing 26. Notably, the leash device 64 differs from the leash device 24 described above in that the housing 26 is slightly larger at the bottom of the handle area in order to house the dispenser 62. In this regard, the leash housing 26 defines an inner cavity 66 and an aperture 68 which permits access to the inner cavity 66.

Within the cavity 66 there is provided an axle guide 70 that is insertable into one end of the tubular axle 44. A spring-loaded pin 72 is also provided within the inner cavity 66 and supported by the lid 74 opposite the axle guide 70, to engage an opposite end of the tubular axle 44 in the manner illustrated. This spring-loaded system keeps the dispenser 62 in place and allows the bag roll to spin when removing a bag 20 through a window 76 formed in a side wall of the pet refuse bag dispenser 62. The particular construction of the dispenser 62 facilitates easy removal of the bags 20 therefrom by maintaining the axis of rotation of the roll 18 in a central position within the inner cavity 66.

The lid 74 comprises a threaded removable cap over the aperture 68 which provides access to the inner cavity 66 of the bag dispenser 62. A cord 78 or the like is interconnected between the lid 74 and the handle 30 so that the lid 74 does not fall to the ground when it is removed to install replacement bags 20.

Figure 11:
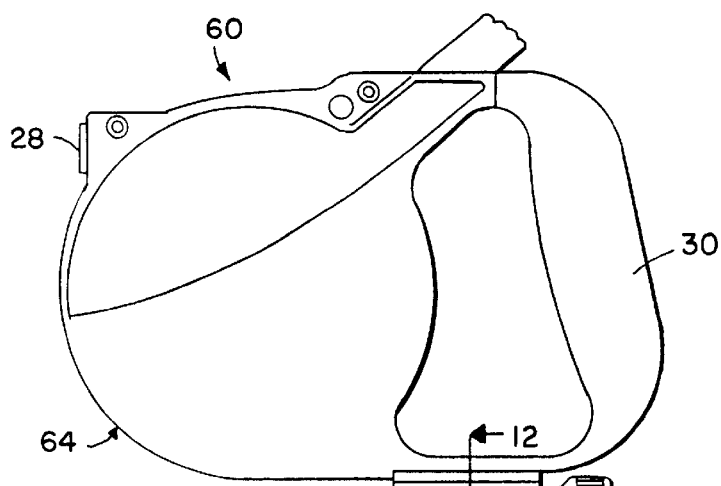
FIG. 11 is an elevational view of a leash assembly embodying the present invention, wherein the pet refuse bag dispenser is removable from the handle of the retractable leash.
Figure 12:
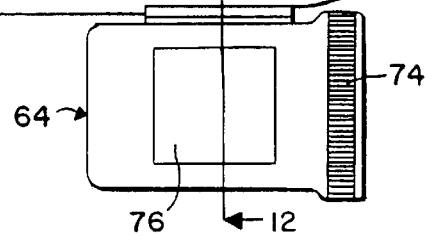
FIG. 12 is an enlarged fragmented sectional view taken generally along the line 12—12 of FIG. 11, wherein the plastic bags are rolled within the pet refuse bag dispenser.
Figure 12:
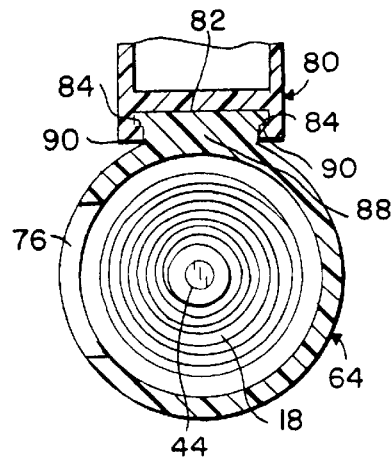

In other embodiments of the present invention, instead of being formed with the handle 30 as in the embodiment of FIGS. 8–10, the pet refuse bag dispenser 62 can be removably attached to the base of the handle 30. For example, the embodiment of FIGS. 11 and 12 shows a clamp 80 having an open faced channel 82 and grooves 84 opposing one another on lateral sides of the channel which is attached to or formed with the base of the handle 30. A rail 86 configured to mate with the open faced channel 82 and grooves 84 is formed or otherwise attached to the top portion of the pet refuse bag dispenser 62. More particularly, the rail comprises a segment 88 extending upwardly from the top of the pet refuse bag dispenser 62 and having flanges 90 extending outwardly at opposing lateral sides of the segment 88. The flanges 90 are configured to slide into the grooves 84 of the clamp 80, resulting in the upper face of the segment 88 lying flush within the open faced channel 82 of the clamp 80. The rail 86 is frictionally fit within the clamp 80 and is slidable into or slidable out of the clamp 80 so as to attach or remove the pet refuse dispenser 62 from the retractable leash handle 30. Although various drawings illustrate either a removable pet refuse bag dispenser or a pet refuse bag dispenser formed integrally with the handle, the reader should appreciate that these may be used interchangeably in the several illustrated embodiments of the present invention.

Figure 13:
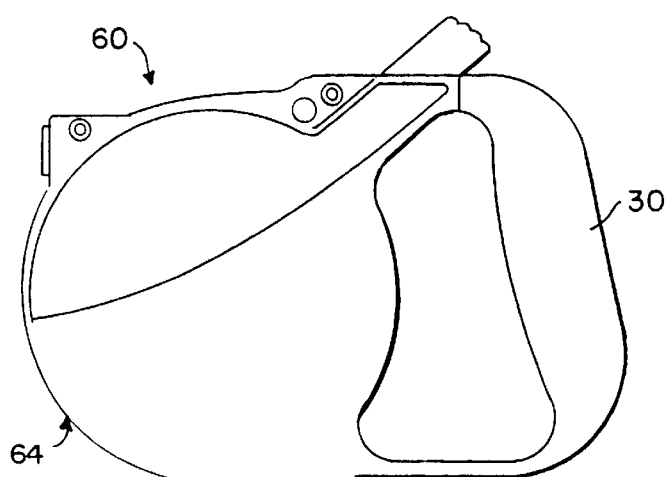
FIG. 13 is an elevational view of a leash assembly embodying the present invention having a cartridge insertable into the bag dispenser and which contains folded plastic bags removable from a side window.
Figure 13:
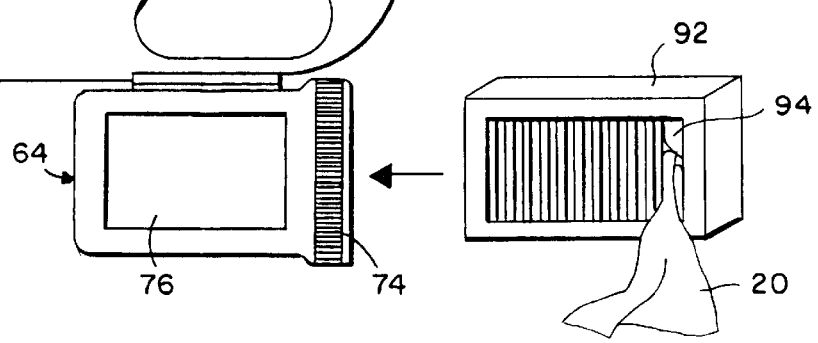

Referring to FIG. 13, a cartridge 92 may be sized such that it is insertable through the open end aperture 68 of the pet refuse bag dispenser 62 so that the corners of the cartridge 92 frictionally fit within the inner cavity 66. The cartridge 92 is provided with a side-wall window 94 which is substantially aligned with the window 76 of the pet refuse bag dispenser 62 when the cartridge 92 is fully inserted into the inner cavity 66. Folded bags 20 are selectively and individually removable through the aligned windows 76 and 94.

Figure 14:
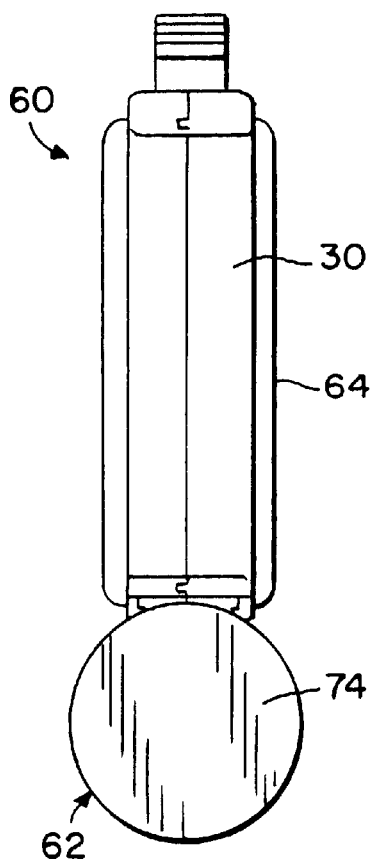
FIG. 14 is an end view of the leash assembly of FIGS. 11–13, wherein a lid covers an open end of the bag dispenser.
Figure 15:
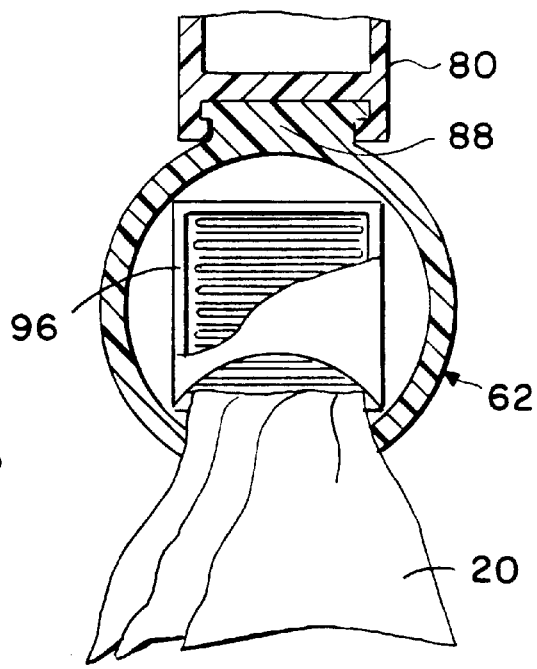
FIG. 15 is a sectional view similar to FIG. 13, illustrating yet another embodiment wherein the lid is removed and the plastic bags are removed from the cartridge from the end of the pet refuse bag dispenser.
Figure 16:
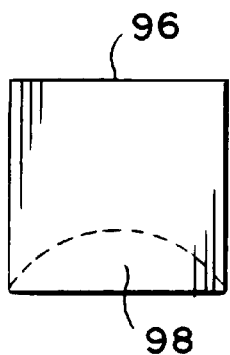
FIG. 16 is an end view of the cartridge of FIG. 15, wherein a tear-away tab portion allows removal of the plastic bags from within the cartridge.

With reference to FIGS. 14–16, a cartridge 96 having a tear-away tab portion 98 formed by small perforations at one end near the base of the cartridge 96 is also insertable into the inner cavity 66 of the pet refuse bag dispenser 62. The tear portion 98 is removed by pinching the tabbed portion 98 and twisting and pulling it away, revealing the bottom-most bag 20 which is accessible for removal. Removal of the bottom-most bag 20 causes the stack of folded bags 20 to shift downward until all of the bags 20 have been removed from the cartridge 96. The cartridge 96 is then disposed of and a new cartridge inserted in its place. During periods when the pet refuse bag dispenser 62 is not being used, the lid 74 can be secured to the open end of the pet refuse bag dispenser 62 to prevent the accidental loss of bags 20 or the cartridge 96.

Figure 17:
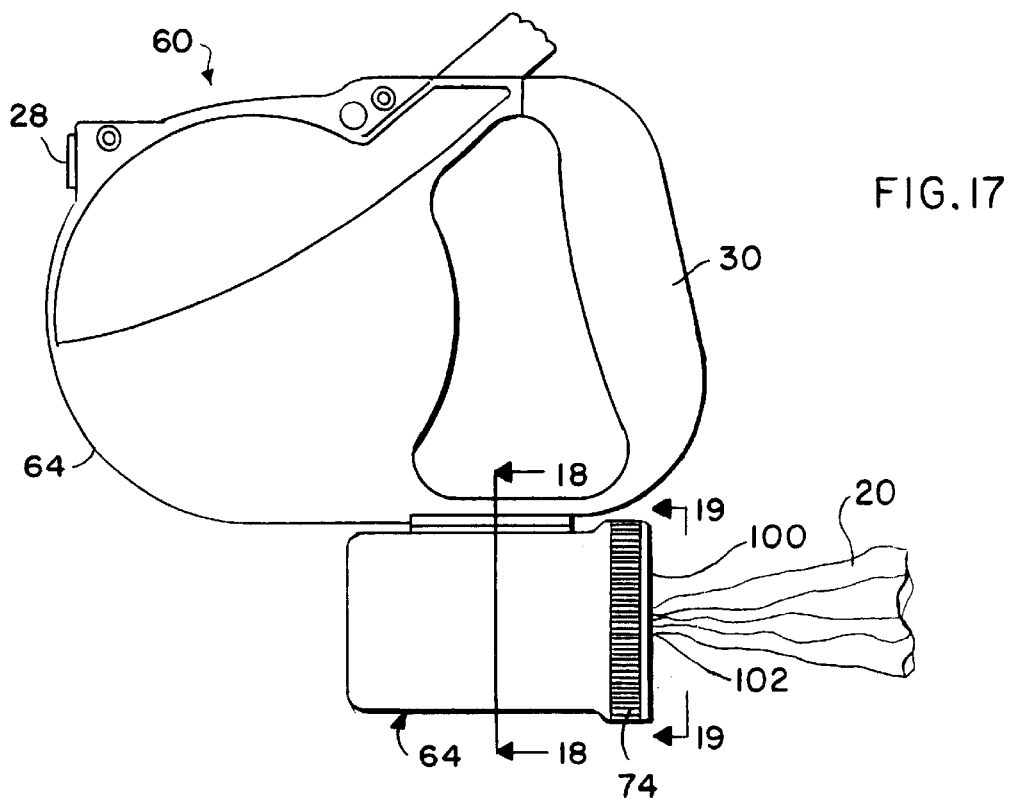
FIG. 17 is an elevational view of another leash assembly embodying the present invention, wherein the plastic bags are removable through the lid of the pet refuse bag dispenser.
Figure 18:
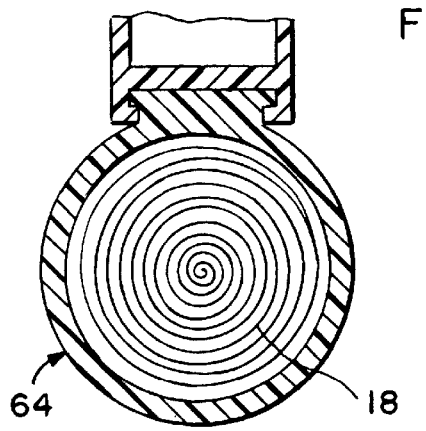
FIG. 18 is an enlarged fragmented sectional view taken generally along line 18—18 of FIG. 17.
Figure 19:
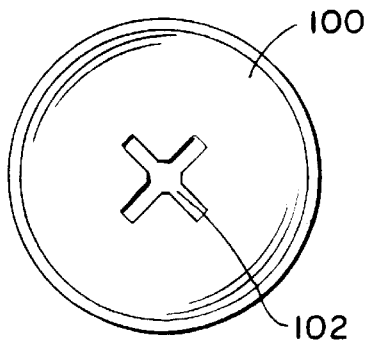
FIG. 19 is an end view taken generally along line 19—19 of FIG. 17, wherein the lid includes slits formed through a flexible membrane for the removal of the plastic bags therefrom.

Referring now to FIGS. 17–19, another way of removing the plastic bags 20 from the pet refuse bag dispenser 62 is illustrated. The lid 74 includes a flexible membrane 100 which has an aperture therethrough, typically in the form of a cross-slit 102. The plastic bags 20 are detachably connected to one another and rolled so that once the first bag is removed from the cross-slit 102, the next bag is partially exposed through the lid 74 for easy removal. The flexible membrane 100 is preferably resilient so that the cross-slit 102 somewhat closes upon the partially exposed bag to hold it in place. In this manner, the next bag of the roll 18 is always partially exposed through the lid 74 until the roll of bags 18 is exhausted. Once exhausted, a new roll of bags 18 is inserted into the inner cavity 66 of the pet refuse bag dispenser 62.

It is contemplated that the retractable leash assemblies 60 of the present invention can also be configured to incorporate into or otherwise attach a radio, a walkie talkie or a cell phone into the housing 26 of the leash 24. With these configurations a user can listen to music or talk with someone while walking his or her pet. A flashlight can also be incorporated into the leash housing 24, providing light while walking the pet during the dark.

From the foregoing it will be appreciated that the leash assemblies 60 of the present invention provide a great convenience by incorporating a pet refuse bag dispenser with a very popular type of leash to provide convenient and ready access to bags 20 when needed. The leash assemblies 60 can be manufactured economically and the features thereof may be embodied into most types of prior leash devices 24.

Although several embodiments of the invention have been described in detail for purposes of illustration, various modifications of each may be made without departing from the spirit and scope of the invention. Accordingly, the invention is not to be limited, except as by the following claims.

What is claimed is:

1. A leash assembly, comprising:
   a housing which defines a handle for the leash assembly and an interior compartment;
   a leash extendable from and retractable into the interior compartment;
   a generally tubular pet refuse bag dispenser underlying the handle, the bag dispenser including a lid which permits access to an inner cavity of the bag dispenser; and
   a plurality of bags disposed within the bag dispenser;
   wherein the lid comprises a removable cap over an open end of the bag dispenser.

2. The leash assembly of claim 1, wherein the plurality of plastic bags are folded and contained within a cartridge which is frictionally fitted within the inner cavity of the bag dispenser.

3. The leash assembly of claim 2, wherein the cartridge includes a tear away tab for the removal of the plastic bags from the open end of the bag dispenser.

4. A leash assembly, comprising:
   a housing which defines a handle for the leash assembly and an interior compartment;
   a leash extendable from and retractable into the interior compartment;
   a generally tubular pet refuse bag dispenser formed integrally with the handle such that the handle forms an inner cavity of the bag dispenser;
   a lid including a removable cap over an open end of the bag dispenser which permits access to the inner cavity of the bag dispenser; and
   a plurality of bags disposed within the bag dispenser.

5. The leash assembly of claim 4, wherein the plurality of bags are rolled and detachably connected end to end.

6. The leash assembly of claim 5, including means for centrally and rotationally retaining the roll of plastic bags within the bag dispenser, the retaining means including a tubular axle about which the roll of plastic bags is wound, and axle guides including an axle guide integrally formed with the lid, and an opposing axle guide formed within an opposite end of the bag dispenser such that the tubular axle, and thus the roll of plastic bags, may rotate within the bag dispenser.

7. The leash assembly of claim 6, including a window formed through a side wall of the bag dispenser for the removal of the plastic bags therethrough.

8. A leash assembly, comprising:
   a housing which defines a handle for the leash assembly and an interior compartment;
   a leash extendable from and retractable into the interior compartment;
   a generally tubular pet refuse bag dispenser removably connected to the handle;
   a lid including a removable cap over an open end of the bag dispenser which permits access to an inner cavity of the bag dispenser; and
   a plurality of bags disposed within the bag dispenser.

9. The leash assembly of claim 8, including a clamp having an open faced channel and opposing side grooves which slidingly accept a mating rail formed on a top portion of the bag dispenser, such that the bag dispenser can be connected to the base of the leash handle by sliding the rail into the clamp.

10. The leash assembly of claim 9, wherein the plurality of bags are rolled and detachably connected end to end.

11. The leash assembly of claim 10, including means for centrally and rotationally retaining the roll of plastic bags within the bag dispenser, the retaining means including a tubular axle about which the roll of plastic bags is wound, and axle guides including an axle guide integrally formed with the lid, and an opposing axle guide formed within an opposite end of the bag dispenser such that the tubular axle, and thus the roll of plastic bags, may rotate within the bag dispenser.

12. The leash assembly of claim 10, including a window formed through a side wall of the bag dispenser for the removal of the plastic bags therefrom.

13. The leash assembly of claim 8, wherein the lid includes an aperture and a flexible membrane having slits substantially aligned with the aperture for the removal of plastic bags from the bag dispenser through the lid.

14. The leash assembly of claim 13, wherein the plurality of plastic bags are rolled and detachably connected end to end.

15. The leash assembly of claim 8, wherein the plurality of plastic bags are folded and contained within a cartridge which is frictionally fifted within the inner cavity of the bag dispenser.

16. The leash assembly of claim 15, wherein the cartridge includes a tear away tab for the removal of the plastic bags from the open end of the bag dispenser.

17. The leash assembly of claim 12, wherein the plurality of plastic bags are folded and contained within a cartridge having a window formed in a side thereof and frictionally fitted within the bag dispenser such that the windows of the bag dispenser and the cartridge substantially align.

18. A leash assembly, comprising:
   a housing which defines a handle for the leash assembly and an interior compartment;
   a leash extendable from and retractable into the interior compartment;
   a generally tubular pet refuse bag dispenser underlying the handle, the bag dispenser including a lid which permits access to an inner cavity of the bag dispenser; and a plurality of bags disposed within the bag dispenser;
wherein the plurality of bags are rolled and detachably connected end to end.

19. The leash assembly of claim 18, including means for centrally and rotationally retaining the roll of plastic bags within the bag dispenser.

20. The leash assembly of claim 19, wherein the means for centrally and rotationally retaining includes a tubular axle about which the roll of plastic bags is wound, and axle guides including an axle guide integrally formed with the lid, and an opposing axle guide formed within an opposite end of the bag dispenser such that the tubular axle, and thus the roll of plastic bags, may rotate within the bag dispenser.

21. A leash assembly, comprising:
a housing which defines a handle for the leash assembly and an interior compartment;
a leash extendable from and retractable into the interior compartment;
a generally tubular pet refuse bag dispenser underlying the handle, the bag dispenser including a lid which permits access to an inner cavity of the bag dispenser;
a plurality of bags disposed within the bag dispenser; and
a window formed through a side wall of the bag dispenser for the removal of the bags therefrom.

22. The leash assembly of claim 21, wherein the plurality of plastic bags are folded and contained within a cartridge having a window formed in a side thereof and frictionally fitted within the bag dispenser such that the windows of the bag dispenser and the cartridge substantially align.

23. A leash assembly, comprising:
a housing which defines a handle for the leash assembly and an interior compartment;
a leash extendable from and retractable into the interior compartment;
a generally tubular pet refuse bag dispenser underlying the handle, the bag dispenser including a lid which permits access to an inner cavity of the bag dispenser; and
a plurality of bags disposed within the bag dispenser;
wherein the lid includes an aperture and a flexible membrane having slits substantially aligned with the aperture for the removal of the bags from the bag dispenser through the lid.

24. The leash assembly of claim 23, wherein the plurality of bags are rolled and detachably connected end to end.

25. A leash assembly, comprising:
a housing which defines a handle for the leash assembly and an interior compartment;
a leash extendable from and retractable into the interior compartment;
a generally tubular pet refuse bag dispenser underlying and formed integrally with the leash handle, the bag dispenser including a lid which permits access to an inner cavity of the bag dispenser; and
a plurality of bags disposed within the bag dispenser.

26. A leash assembly, comprising:
a housing which defines a handle for the leash assembly and an interior compartment;
a leash extendable from and retractable into the interior compartment;
a generally tubular pet refuse bag dispenser underlying and removably connected to the leash handle, the bag dispenser including a lid which permits access to an inner cavity of the bag dispenser; and
a plurality of bags disposed within the bag dispenser.

27. The leash assembly of claim 26, including a clamp having an open faced channel and opposing side grooves which slidingly accept a mating rail formed on a top portion of the bag dispenser, such that the bag dispenser can be connected to the base of the leash handle by sliding the rail into the clamp.

* * * * *

(12) EX PARTE REEXAMINATION CERTIFICATE (9376th)

United States Patent
Edwards et al.

(10) Number: US 6,223,695 C1
(45) Certificate Issued: *Oct. 25, 2012

(54) LEASH ASSEMBLY HAVING PET REFUSE BAG DISPENSER MECHANISM

(75) Inventors: Timothy Edwards, Westlake Village, CA (US); Mary Edwards, Westlake Village, CA (US)

(73) Assignee: RPG Bags, LLC, Irving, TX (US)

Reexamination Request:
No. 90/012,056, Dec. 16, 2011

Reexamination Certificate for:
Patent No.: 6,223,695
Issued: May 1, 2001
Appl. No.: 09/387,805
Filed: Sep. 1, 1999

( * ) Notice: This patent is subject to a terminal disclaimer.

Related U.S. Application Data

(60) Provisional application No. 60/100,484, filed on Sep. 16, 1998, provisional application No. 60/040,998, filed on Apr. 21, 1997.

(51) Int. Cl.
*A01K 27/00* (2006.01)
*B65H 75/34* (2006.01)

(52) U.S. Cl. .......................... 119/796; 119/795; 119/858

(58) Field of Classification Search .................. None
See application file for complete search history.

(56) References Cited

To view the complete listing of prior art documents cited during the proceeding for Reexamination Control Number 90/012,056, please refer to the USPTO's public Patent Application Information Retrieval (PAIR) system under the Display References tab.

*Primary Examiner* — William Doerrler

(57) ABSTRACT

A leash assembly includes a retractable leash in combination with a pet refuse bag dispenser. The bag dispenser underlies a handle of the leash and includes a lid for permitting access to an inner cavity in which a plurality of bags are disposed. The bag dispenser is either integrally formed with the leash handle, or removably connected to a base of the handle. The plastic bags are disposed within the inner cavity such that the bags may be individually removed. The plastic bags may be selectively removed through a window provided in a side wall of the bag dispenser. The plastic bags may also be removed through a lid having slits through a flexible membrane. Alternatively, a cartridge containing the folded bags is inserted into the bag dispenser and either includes a window which substantially aligns with the bag dispenser window for access to the plastic bags, or a tear away tab for the removal of the bags through an open end of the bag dispenser.

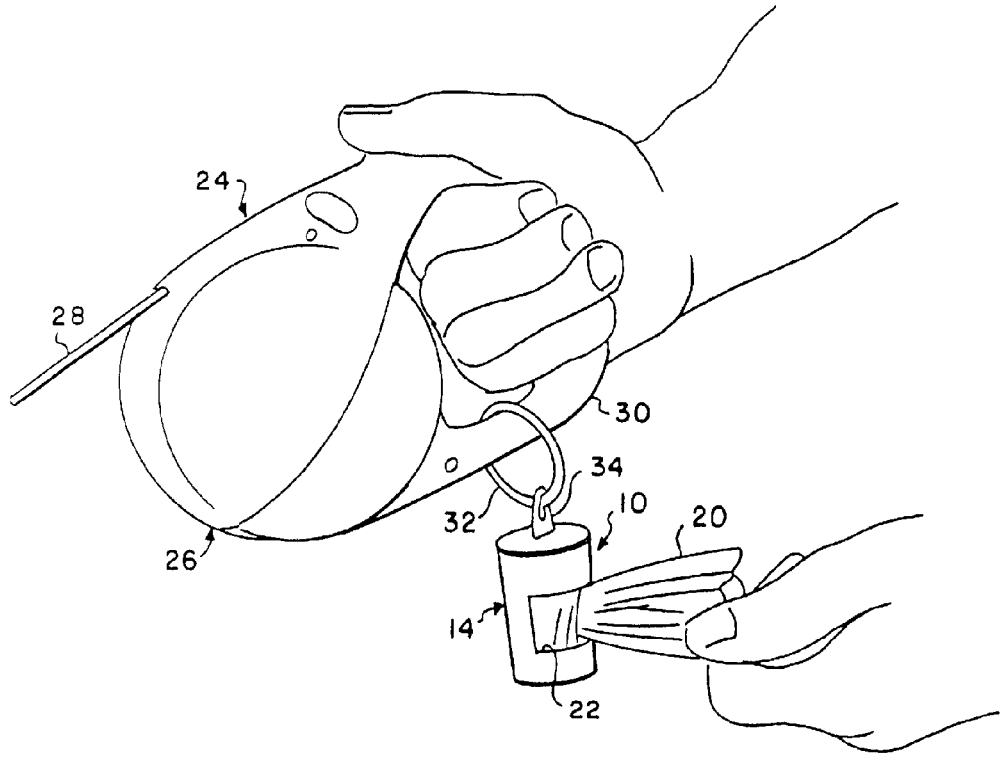

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 17 and 22 is confirmed.

Claims 1-16, 18-21 and 23-27 are cancelled.

* * * * *